United States Patent [19]

Nash et al.

[11] Patent Number: 4,998,055
[45] Date of Patent: Mar. 5, 1991

[54] EXTERNALLY RECHARGEABLE BATTERY PACK FOR A COMPUTER

[75] Inventors: Phillip T. Nash, Sunnyvale; Lee A. Watkins, San Jose, both of Calif.

[73] Assignee: Grid Systems Corporation, Fremont, Calif.

[21] Appl. No.: 364,920

[22] Filed: Jun. 12, 1989

[51] Int. Cl.[5] .................... H01M 14/00; H02J 7/00
[52] U.S. Cl. .......................................... 320/2; 429/7
[58] Field of Search ...................... 320/2, 48; 429/7

[56] References Cited

U.S. PATENT DOCUMENTS 4,595,872 6/1986 Ball ................................ 320/48 X

OTHER PUBLICATIONS

Sony D-88 Operating Instructions, (Compact Disc Player) Sony Corp., 1988.

Sony D-3 Operating Instructions, (Compact Disc Player) Sony Corp., 1986.

Primary Examiner—R. J. Hickey
Attorney, Agent, or Firm—Townsend & Townsend

[57] ABSTRACT

A rechargeable battery pack for a portable computer or other battery-powered device permits recharging of the battery while it is in the computer, or removal of the entire battery pack and recharging of the battery external to the computer by connecting an AC-DC converter directly to the battery pack. This permits removal of a battery pack and replacement with a charged battery pack, so that the portable computer is not occupied with battery charging and can be taken into the field while another battery pack is being charged. In the battery pack of the invention a DC power jack is located on the battery pack, identical to the DC jack on the exterior of the computer.

5 Claims, 1 Drawing Sheet

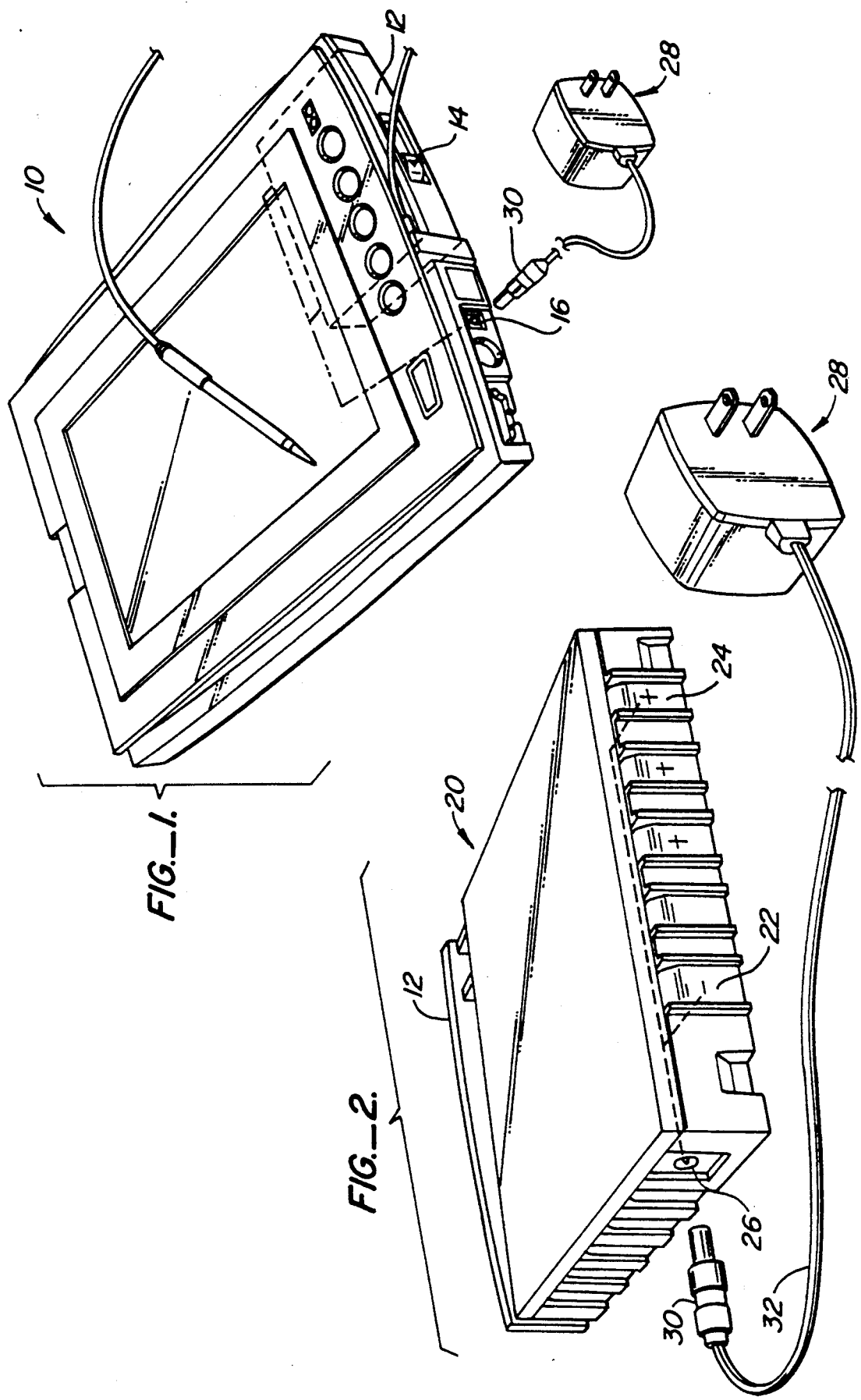

EXTERNALLY RECHARGEABLE BATTERY PACK FOR A COMPUTER

BACKGROUND OF THE INVENTION

This invention relates to portable electrical devices powered by batteries, and in particular the invention is concerned with a battery pack for such a device, and a convenient system for recharging the battery pack while still allowing the portable electrical device to be used in the field.

Many portable computers and other portable electrical devices have removable, rechargeable battery packs which contain a number of cells. In order to charge one of these battery packs, one can either charge the battery while it is in the computer or electrical device, or one can remove the battery pack and connect it into an external battery charger made specifically for the battery pack.

Charging the battery while it is in the electrical device is the easier method. This is done simply by using the AC-DC converter and input power plug normally sold with the device and used for powering the device without the battery, such as in an office with wall current available.

However, this charging method is limited in that one battery cannot be charged while another is taken into the field with the computer or other electrical device.

An external battery charger designed for the specific battery pack will allow the charging of one or more batteries at the operator's home or office, while another is taken into the field in the computer or other device. However, this requires purchase of the separate, dedicated battery charger.

SUMMARY OF THE INVENTION

In accordance with the present invention, a battery pack for use in a portable computer or other portable electrical device includes a DC power jack directly in the battery pack, functionally identical to the DC jack on the exterior of the housing of the computer or other device itself. The battery within the battery pack can be charged either by connecting it directly to an AC-DC converter for the electrical device, or by putting the battery pack in the computer and plugging the AC-DC converter into the computer. Thus, the AC-DC converter input plug can be used to run the computer (or other device) without draining the on-board battery; it can be used to charge the battery within the computer; or it can be used to charge the battery pack externally to the computer, while the computer is in use with another battery pack.

The electrical device can be purchased with two battery packs, so that one battery pack can be charged using the AC-DC converter while the other is used to power the electrical device in the field.

Therefore, it is among the objects of the present invention to provide the advantages of a separate, dedicated external battery charger without the user's having to purchase such a dedicated battery charger, by enabling a battery pack to be directly charged outside an electrical device using an AC-DC converter supplied with the device.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

FIG. 1 is a perspective view showing an example of a portable computer which may include an externally rechargeable battery pack in accordance with the principles of the present invention.

FIG. 2 is a perspective view showing the battery pack as removed from the computer or other electrical device, and including a DC input jack for direct charging of the battery pack.

DESCRIPTION OF PREFERRED EMBODIMENTS

In the drawings, FIG. 1 shows a hand held portable computer 10, as an example of a portable electrical device within which a battery pack in accordance with the invention may be used. The hand held computer 10 may be, for example, of the construction described in copending patent application Ser. No. 07/365,147, entitled "Hand Held Computer", filed on the same date as this application, assigned to the same assignee as the present invention and incorporated herein by reference.

In FIG. 1, the hand held computer 10 is shown as having a front panel 12 of a battery pack which is removable from the computer and which may be constructed in accordance with the invention. The front panel 12 of the battery pack includes a releasable latch 14 which may be engaged and depressed with a user's finger to release the battery pack so that it may be pulled from the computer.

FIG. 1 also shows that the computer 10 has a DC power input jack 16, which may be of conventional configuration for receiving a DC current from a transformer/rectifier as used for portable computers and other portable electrical devices. The DC input jack 16 may be connected to power the computer 10 when the computer is used in a home or office with wall current available. It can also be used to recharge the battery within the battery pack inside the computer.

FIG. 2 shows the battery pack 20 as removed from the computer 10 or other portable electrical device. The front panel 12 is oriented in a direction away from view in FIG. 2.

As FIG. 2 illustrates, the battery pack 20 has electrical contacts 22 and 24 for electrical engagement with corresponding pickup contacts within the electrical device, which may lead to a printed circuit board in the case of the computer 10. The contacts 22 and 24 are connected inside the battery pack 20 to draw current from a battery of rechargeable electrical cells in the pack when the contacts 22 and 24 are engaged in the device and power is being drawn. The batteries in the battery pack 20 may be rechargeable NiCad type cells. The battery pack 20 may also accept standard dry cells, if it is constructed in accordance with the principles of copending application Ser. No. 07/364,921, entitled "Battery Compartment", filed on the same date as this application, assigned to the same assignee as the present invention and incorporated herein by reference. However, the battery pack 20 of the present invention need not be constructed similarly to the referenced copending application. Although five contacts, including the contacts 22 and 24, are shown on the back of the battery pack in FIG. 2, this relates to the construction disclosed in the copending application and only the two contacts 22 and 24 can be provided if desired.

The central feature of this invention is that the battery pack 20 has a DC input jack 26 built into it and exposed at one side of the battery pack as shown in FIG. 2. The DC jack 26 is connected internally to contacts which engage the battery cells, so as to enable recharging of rechargeable battery cells contained in the battery pack 20. The DC input jack 26 is functionally identical to the DC input jack 16 shown at an edge of the portable computer 10 or other portable electrical device in FIG. 1.

FIG. 2 also shows an AC-DC converter 28, ordinarily a transformer/rectifier, of the generally conventional type having a DC power plug 30 at the end of a cord 32. The DC power plug 30 fits both the battery pack input jack 26 and the exterior DC input jack 16 of the portable electrical device.

It is therefore seen that with the present invention, the same AC-DC converter 28 can be used to directly power a portable electrical device, as by plugging the converter's input plug into the device's external DC jack 16; to charge a battery of rechargeable cells contained within the electrical device 10, within a battery pack; and to recharge the battery in the battery pack 20 by plugging the DC input plug 30 directly into the DC input jack 26 of the battery pack, once the battery pack has been removed from the device 10.

When the converter 28 is used to recharge the removed battery pack 20, the computer 10 or other portable device can at the same time be powered by another battery pack so that it can be used in the field while the other battery pack is being recharged. In this way, a separate, dedicated battery recharger need not be purchased as would ordinarily be the case in order to enable one battery pack to be used in the field while the other is being recharged. The functionally identical DC jacks 16 and 26 on the computer and on the battery pack, both configured to receive the same DC input plug 30, accomplish this function.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. In a battery hand held portable computer having an external battery charging DC input jack on the computer housing for receipt of a charger input plug carrying a charging current for the battery, the improvement comprising, a battery pack for containing a battery of rechargeable cells and with removal means for removing the battery pack from the computer housing, means for electrically connecting the external jack on the housing of the hand held portable computer to the battery of rechargeable cells within the battery pack, when the battery pack is in place within the computer housing, and recharge jack, means on the battery pack, functionally similar to the DC input jack on the exterior of the computer housing, for receiving said charger input plug directly and for electrically connecting the input plug to the rechargeable battery cells within the battery pack when the battery pack has been removed from the hand held portable computer, whereby the battery pack may be removed from the computer and connected to the charger input plug to charge the battery pack externally, or the battery of rechargeable cells may be charged inside the computer by applying the charger input plug to the DC input jack of the computer housing when the battery pack is inside the computer housing.

2. The improvement defined in claim 1, further including a second, substantially identical battery pack with battery cells, so that the two battery packs may be used interchangeably in the hand held portable computer and one may be recharged externally to the computer while the other, in charged condition, is used in the computer.

3. In combination:

a battery pack for containing a battery of rechargeable cells, said pack including an external battery charging DC input jack connectable with a charger input plug capable of supplying a charging current for the rechargeable cells within the battery pack;

a portable computer housing having an external battery charging DC input jack connectable with the charger input plug, said computer housing having a receptacle region for the battery pack; and means for electrically connecting the external battery charging DC input jack carried by the computer housing with the rechargeable cells when the battery pack is installed in the computer housing receptacle region, whereby the rechargeable cells within the battery pack can be charged inside the computer by connecting the external battery charging DC input jack carried by the computer housing to the charger input plug when the battery pack is installed in the receptacle region so that the rechargeable cells are electrically connected to the external battery charging DC input jack of the computer housing by the connecting means, and whereby the rechargeable cells within the battery pack can be charged outside the computer by connecting the external battery charging DC input jack of the battery pack to the charger input plug when the battery pack si removed from the receptacle region.

4. The invention of claim 3 wherein the external battery charging DC input jack of the battery pack is located in a position on the battery pack which is inaccessible when the battery pack is installed in the receptacle region of the computer housing.

5. The invention of claim 3 wherein the connecting means includes a spaced pair of electrically conductive contacts carried by the battery pack.

* * * * *